United States Patent
Hsiao (12)

(10) Patent No.: US 6,217,170 B1
(45) Date of Patent: Apr. 17, 2001

(54) MAGNETIC COUPLING SYSTEM FOR SECURING A TEMPLE TO AN EYEGLASS HINGE

(76) Inventor: Yu-Teng Hsiao, No. 63 Kuo Yang 3rd Street, Chia Yi City (TW)

( * ) Notice: Subject to any disclaimer, the term of this patent is extended or adjusted under 35 U.S.C. 154(b) by 0 days.

(21) Appl. No.: 09/608,014
(22) Filed: Jun. 30, 2000
(51) Int. Cl.⁷ .................................................. G02C 5/22
(52) U.S. Cl. ............................ 351/153; 351/140; 16/228
(58) Field of Search ................................ 351/153, 111, 351/121, 140; 16/228

(56) References Cited

U.S. PATENT DOCUMENTS 4,196,981 * 4/1980 Waldrop ................................ 351/153
5,682,222 * 10/1997 Chao ..................................... 351/140

* cited by examiner

Primary Examiner—Huy Mai
(74) Attorney, Agent, or Firm—Rosenberg, Klein & Lee

(57) ABSTRACT

A magnetic coupling system for securing a temple to an eyeglass hinge includes a pivotal flange on the rear end of the eyeglass hinge and one clipping structure formed on the front end of the temple. One coupling magnet is provided in the pivotal flange of the eyeglass hinge. The clipping structure includes a pair of opposed pivotal flanges spaced one from the other to capture the pivotal flange of the eyeglass hinge therebetween and two magnets respectively secured in the pair of opposed pivotal flanges for respective magnetic coupling to the coupling magnet in the pivotal flange of the eyeglass hinge. Therefore, the temple is pivotally coupled to the eyeglass hinge in a magnetically reinforced manner.

1 Claim, 3 Drawing Sheets

MAGNETIC COUPLING SYSTEM FOR SECURING A TEMPLE TO AN EYEGLASS HINGE

BACKGROUND OF THE INVENTION

1. Field of the Invention

This invention relates to a magnetic coupling system, and more particularly to a coupling system which is provided with forceful magnets for pivotally securing a temple to an eyeglass hinge.

2. Description of the Related Art

Referring to FIG. 3, a conventional coupling system for securing a temple 92 to a hinge 901 of an eyeglasses 90 includes the hinge 901 and the pivotal member 921 at the front end of the temple 92. The hinge 901 is provided with holes 902 in the pivotal member of the hinge 901, and the pivotal member 921 of the temple 92 is provided with a hole 922 in the center. After the pivotal member 921 being inserted in the pivotal member of the hinge 901, a screw 93 is screwed through the holes of 902 and 922 so as to pivotally secure the temple 92 to the hinge 901 of the eyeglasses 90.

However, after being used for a period of time, the screw 93 will be gradually loosen because the frequent movement of the temple 92. If a wearer is unwary of the loosen screw, the eyeglasses 90 worn by the wearer will fall down at any time.

SUMMARY OF THE INVENTION

Accordingly, an objective of the present invention is to provide a magnetic coupling system which is convenient for pivotally securing a temple to a hinge of an eyeglasses.

Another objective of the present invention is to provide a magnetic coupling system whose forceful magnets are inlaid in the pivotal flanges of the eyeglass hinge and the temple so as to pivotally couple the temple to the eyeglass hinge in a magnetically reinforced manner.

To achieve these advantages, a magnetic coupling system for securing a temple to an eyeglass hinge in the present invention includes a pivotal flange on the rear end of the eyeglass hinge and one clipping structure formed on the front end of the temple. One coupling magnet is provided in the pivotal flange of the eyeglass hinge. The clipping structure includes a pair of opposed pivotal flanges spaced one from the other to capture the pivotal flange of the eyeglass hinge therebetween and two magnets respectively secured in the pair of opposed pivotal flanges for respective magnetic coupling to the coupling magnet in the pivotal flange of the eyeglass hinge. Therefore, the temple is pivotally coupled to the eyeglass hinge in a magnetically reinforced manner.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
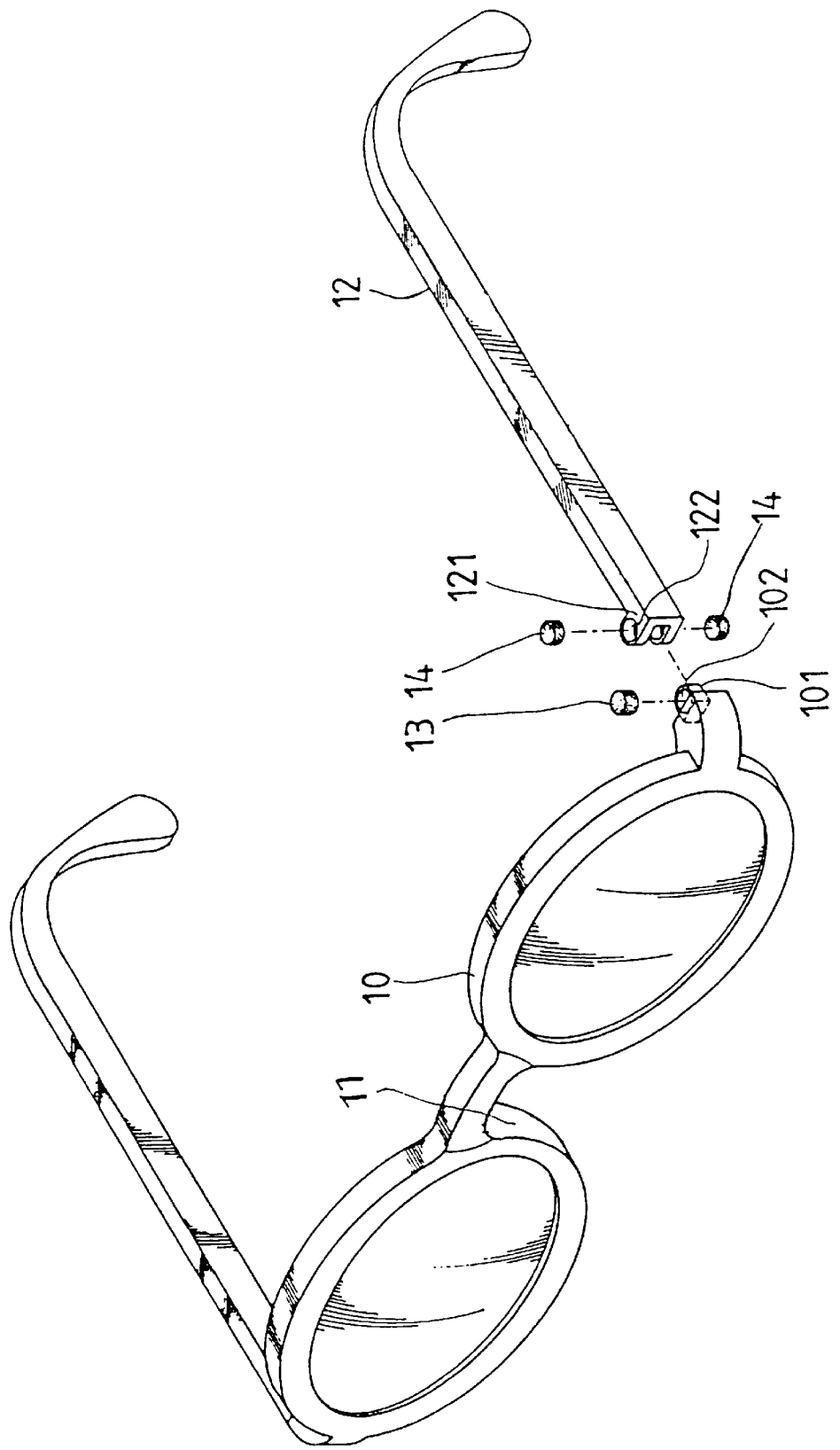
FIG. 1 is an exploded perspective view of the magnetic coupling system for securing a temple to an eyeglass hinge in accordance with the present invention.
Figure 2:
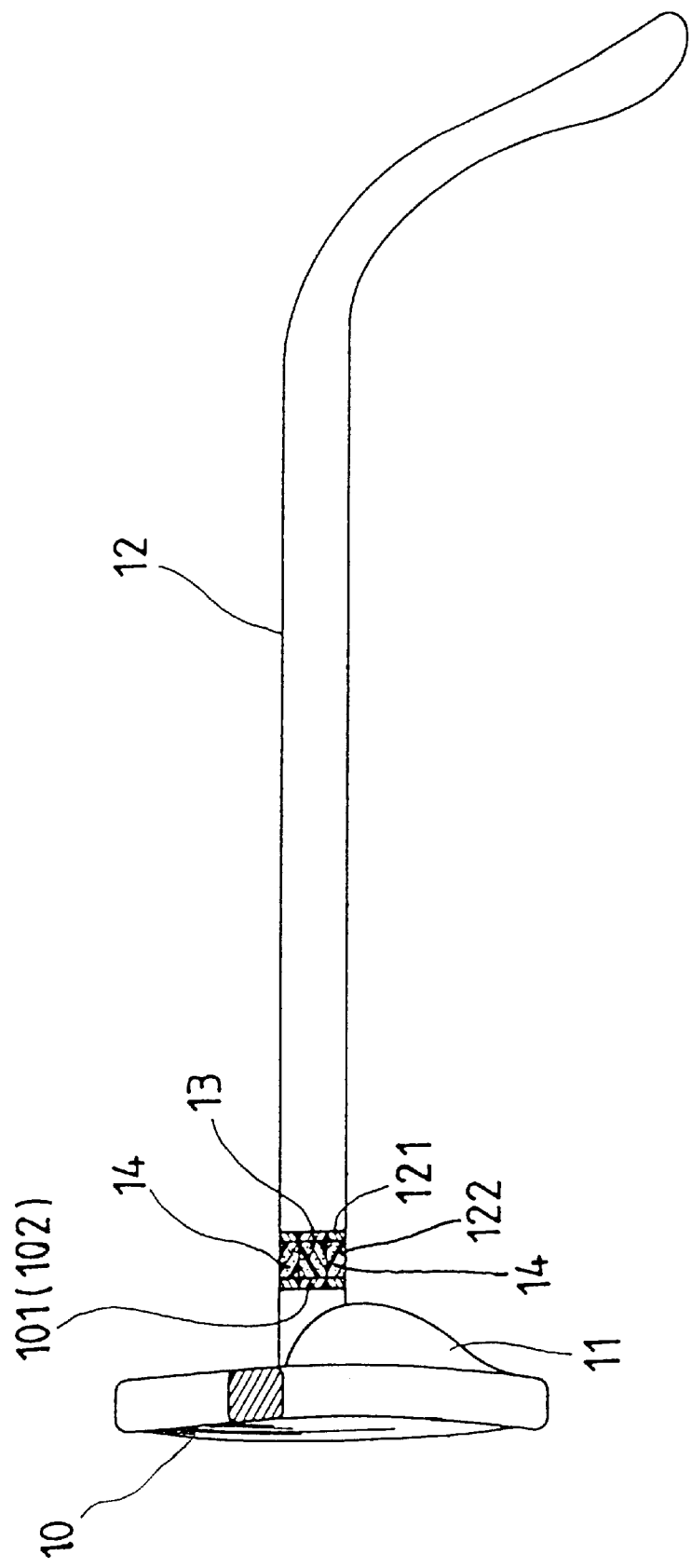
FIG. 2 is a side sectional view of the magnetic coupling system for securing a temple to an eyeglass hinge in an assembled configuration in accordance with the present invention; and, FIG. 3 is an exploded perspective view of a conventional coupling system for securing a temple to an eyeglass hinge.
Figure 3:
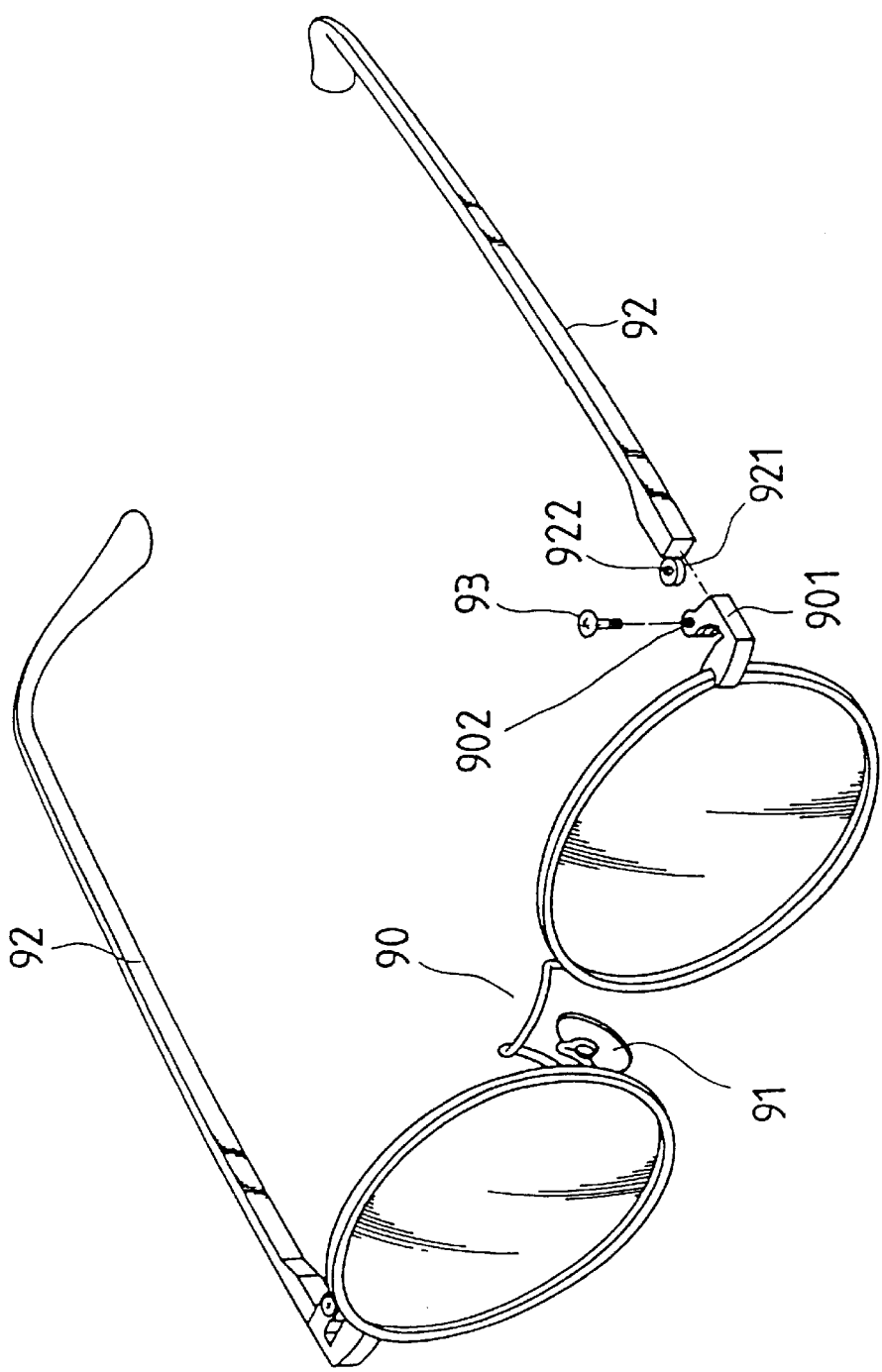

Referring to FIGS. 1 and 2, an eyeglasses with the magnetic coupling system in the present invention is composed by a frame 10, a pair of nose pads 11 and a pair of temples 12. The magnetic coupling system for securing either temple 12 to the corresponding eyeglass hinge of the frame 10 includes a pivotal flange 101 provided on the rear end of the eyeglass hinge and one clipping structure formed at the front end of the temple 12. A hole 102 is provided in the pivotal flange 101, and one coupling magnet 13 is secured in the hole 102 of the pivotal flange 101 of the eyeglass hinge. The clipping structure includes a pair of opposed pivotal flanges 121 spaced one from the other to capture the pivotal flange 101 of the eyeglass hinge therebetween and two magnets 14 respectively secured in the holes 122 of the opposed pivotal flanges 121 for respective magnetic coupling to the coupling magnet 13 in the pivotal flange 101 of the eyeglass hinge. Therefore, the temple 12 is pivotally coupled to the eyeglass hinge of the frame 10 in a magnetically reinforced manner.

While the preferred embodiments of the invention have been described above, it will be recognized and understood that various modifications may be made therein and the appended claims are intended to cover all such modifications which may fall within the spirit and scope of the invention.

What is claimed is:

1. A magnetic coupling system for securing a temple to an eyeglass hinge comprising:

a pivotal flange being provided on the rear end of an eyeglass hinge, a hole being provided in said pivotal flange, one coupling magnet being secured in said hole of said pivotal flange of said eyeglass hinge; and, one clipping structure being formed at the front end of a temple corresponding to said eyeglass hinge, said clipping structure being provided with a pair of opposed pivotal flanges spaced one from the other to capture said pivotal flange of said eyeglass hinge therebetween and two magnets respectively secured in the holes of said opposed pivotal flanges for respective magnetic coupling to said coupling magnet in said pivotal flange of said eyeglass hinge so as for said temple to be pivotally coupled to said eyeglass hinge in a magnetically reinforced manner.

* * * * *